US011418357B2

(12) United States Patent
Howland et al.

(10) Patent No.: US 11,418,357 B2
(45) Date of Patent: Aug. 16, 2022

(54) VIRTUAL REALITY SYSTEMS AND METHODS WITH CROSS PLATFORM INTERFACE FOR PROVIDING SUPPORT

(71) Applicant: eXp World Technologies, LLC, Bellingham, WA (US)

(72) Inventors: Alex Howland, San Diego, CA (US); Scott Petronis, Albany, NY (US); Erik Hill, San Diego, CA (US); Wesley Hawkins, San Diego, CA (US)

(73) Assignee: eXp World Technologies, LLC, Bellingham, WA (US)

( * ) Notice: Subject to any disclaimer, the term of this patent is extended or adjusted under 35 U.S.C. 154(b) by 189 days.

(21) Appl. No.: 16/840,021

(22) Filed: Apr. 3, 2020

(65) Prior Publication Data
US 2020/0328908 A1   Oct. 15, 2020

Related U.S. Application Data

(60) Provisional application No. 62/829,334, filed on Apr. 4, 2019.

(51) Int. Cl.
| | |
|---|---|
| *H04L 12/18* | (2006.01) |
| *H04L 65/403* | (2022.01) |
| *G06Q 30/00* | (2012.01) |
| *G06Q 10/06* | (2012.01) |
| *H04L 65/401* | (2022.01) |

(Continued)

(52) U.S. Cl.
CPC .. *H04L 12/1822* (2013.01); *G06Q 10/063112* (2013.01); *G06Q 30/016* (2013.01); *G06Q 30/0185* (2013.01); *H04L 12/1818* (2013.01); *H04L 65/1069* (2013.01); *H04L 65/403* (2013.01); *H04L 65/4007* (2013.01); *H04L 67/38* (2013.01); *H04W 12/50* (2021.01); *H04L 67/306* (2013.01)

(58) Field of Classification Search
CPC ........ G06Q 10/063112; G06Q 30/016; G06Q 30/0185; H04L 12/1818; H04L 12/1822; H04L 65/1069; H04L 65/4007; H04L 65/403; H04L 67/306; H04L 67/38; H04W 12/50
See application file for complete search history.

(56) References Cited

U.S. PATENT DOCUMENTS 8,591,326 B2 * 11/2013 Shuster ................... A63F 13/75
463/29
9,761,056 B1 * 9/2017 Gentilin .................. G06F 3/011
(Continued)

*Primary Examiner* — Thomas J Dailey
(74) *Attorney, Agent, or Firm* — Seed IP Law Group LLP

(57) ABSTRACT

An example method for managing access to a VR platform includes causing presentation of a virtual room including display of a plurality of user identifiers corresponding to users using a non-VR mobile application and users using the VR platform. The plurality of user identifiers are sorted on a wait list based on an elapsed wait time associated with each user. The example method also includes causing display of a graphical assistance pod, and responsive to its activation, displaying a user interface to present tools usable selectable by a support representative for managing interactions with the plurality of users. The example method further includes establishing a secure communication channel between the support representative and the at least one of the plurality of users using the non-VR mobile application.

20 Claims, 20 Drawing Sheets

(51) Int. Cl.
    *H04W 12/50*     (2021.01)
    *H04L 65/1069*     (2022.01)
    *H04L 67/131*     (2022.01)
    *H04L 67/306*     (2022.01)

(56) References Cited

U.S. PATENT DOCUMENTS

| | | | |
|---|---|---|---|
| 10,035,068 B1* | 7/2018 | Wakeford | A63F 13/45 |
| 2014/0214629 A1* | 7/2014 | Azam | G06Q 30/0643 |
| | | | 705/27.2 |
| 2017/0206708 A1* | 7/2017 | Gentilin | G06T 19/20 |
| 2017/0221267 A1* | 8/2017 | Tommy | G09B 5/125 |
| 2017/0289221 A1* | 10/2017 | Khalid | H04L 65/602 |
| 2018/0005247 A1* | 1/2018 | Loeb | G06Q 30/016 |
| 2018/0262583 A1* | 9/2018 | Primus | H04L 67/22 |
| 2019/0066378 A1* | 2/2019 | Sheftel | G06T 19/003 |
| 2019/0332400 A1* | 10/2019 | Spoor | G06F 9/453 |
| 2019/0374857 A1* | 12/2019 | Deller | H04L 67/38 |
| 2020/0067998 A1* | 2/2020 | Pilnock | A63F 13/352 |

* cited by examiner

VIRTUAL REALITY SYSTEMS AND METHODS WITH CROSS PLATFORM INTERFACE FOR PROVIDING SUPPORT

CROSS-REFERENCE TO RELATED APPLICATIONS

This application claims the benefit of provisional U.S. Application No. 62/829,334, filed Apr. 4, 2019 and entitled "Virtual Reality Systems and Methods with Cross Platform Interface for Providing Support," which is hereby incorporated by reference in its entirety.

BACKGROUND

1. Technical Field

The presently disclosed technology relates generally to virtual reality (VR) systems, and more particularly to systems and methods that permits a VR system to interface with non-VR systems.

2. Description of Related Art

As the information age continues to drive advanced means of communicating, sharing ideas, and obtaining assistance, more and more systems and means of communicating and/or providing services have evolved (herein "communication systems"). So too has related software (herein, "communication software"). Unfortunately, many communication systems are not compatible with each other, often because their respective communication software is not compatible.

Many communication systems and related communication software are designed with completely different objectives in mind. For instance, Virtual Reality ("VR") systems and related VR software are designed to optimize user interactions by providing extensive virtual worlds within which users can navigate. Many such systems are designed for in-home and/or in-office equipment where weight, power usage, and size (i.e. "portability") is a secondary concern. Portability of other systems, however, is a primary concern. For instance, many phones, tablets, and other portable and/or mobile devices include communication software that is configured to maximize battery life while minimizing data requirements. Consequently, few, if any, mobile devices are capable of adequately operating the latest VR and/or other sophisticated software.

As technology of mobile and other portable devices increases, so too does the sophistication and requirements of VR software. Consequently, mobile device capabilities will likely always lag behind the latest VR software requirements. Furthermore, commercial pressures and other considerations often prevent or discourage software developers and/or device manufacturers from creating cross-platform software and/or devices. Consequently, it would be beneficial to have a system for and methods of creating a cross-platform interface session for allowing a user of a first device, such as a mobile device, to communicate with a separate device, such as a VR device, through the interface session.

SUMMARY

According to various embodiments, a system for, and methods of, providing cross-platform interfaces for initiating communication and/or otherwise sharing information between users (e.g., during an "interface session") are provided. In at least one embodiment, a first user interfaces with the system from a first platform through a first device and a second user interfaces with the system from a second platform through a second device. In some embodiments, the first platform is a virtual reality platform (a "VR Platform") and the first device is a computer, a mobile device, or any other compatible system or device now known or later developed (a "VR device") that is capable of executing or directly accessing the VR Platform. In some embodiments, the second platform is an application platform (hereinafter "App Platform") and the second device is a smartphone, a tablet, a computer, or any other device or system now known or later developed (an "App device"). In some embodiments, the App Platform may be a non-VR application platform, such as a non-VR mobile client application that may be installed on a mobile user device (e.g., a smartphone, a tablet computer, a smartwatch, and so forth). In some embodiments, each of the first and second platforms is a VR Platform, an App Platform, or some other platform now known or later developed. In some embodiments, each of the first and second devices is a mobile device, or any other device now known or later developed that is capable of operating and/or providing an interface for its respective platform.

DETAILED DESCRIPTION

Figure 1:
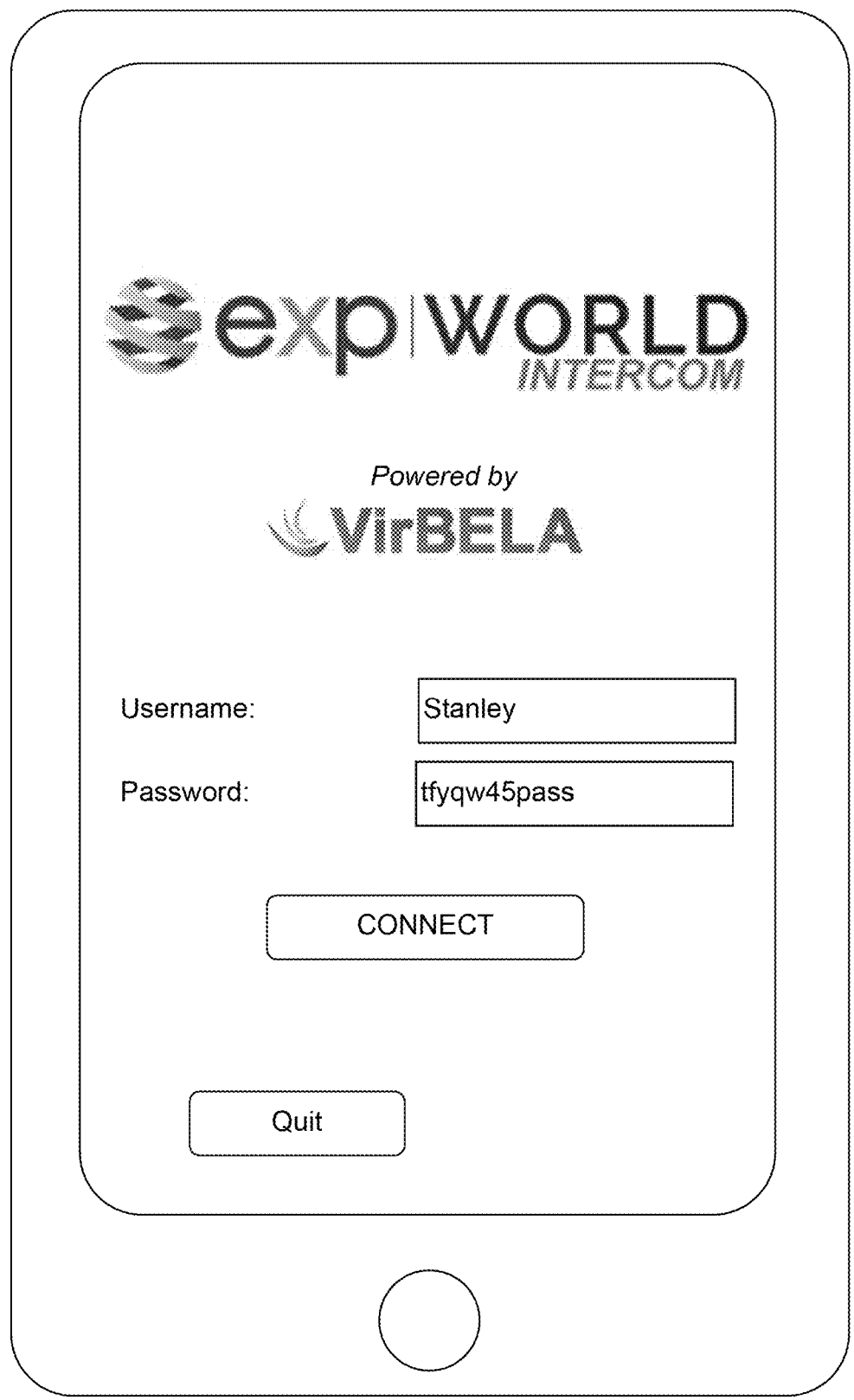
FIG. 1 illustrates a mobile device (an "App device") displaying a login screen for an application platform (an "App Platform"), the login screen prompting a user of the App Platform (an "App user") to enter credentials for initiating an application session (an "App session") within the App Platform, in accordance with some embodiments.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or methods associated with communication networks and virtual reality have not been shown or described in detail to avoid unnecessarily obscuring descriptions of the embodiments.

Example VR Platforms

According to various embodiments, a VR Platform is provided that is capable of providing a virtual world and a plurality of avatars that may be associated with one or more users of the VR Platform (each a VR user) as well as one or more users of non-VR Platforms. The VR Platform is configured to locate a plurality of avatars in one or more locations within the virtual world, thereby allowing associated VR users to selectively interact with the virtual world and/or with one or more other avatars, some of which may be associated with non-VR users, within the virtual world. In this way, the VR Platform allows VR users to interact with the VR Platform and/or with other VR users as well as non-VR users.

In some embodiments, the VR Platform is a virtual reality support center platform. In some embodiments, each avatar may be classified as a customer avatar or as an employee avatar, such classifications being determined by a classification of an associated VR user. In some embodiments, employee avatars may be further categorized, for example, as resource avatars, specialist avatars, manager avatars, or the like. Such classification of an employee avatar may provide an indication to VR users as to what level of authority and/or information an associated VR user, associated with the employee avatar, may have (e.g., a resource avatar may be associated with a VR user having general knowledge of standard rules and procedures and limited or no authority to deviate from standard rules and procedures (a "resource user"), a specialist avatar may be associated with a VR user having specialized training in at least one area (a "specialist user"), and/or a manager avatar may be associated with a VR user having authority over one or more other VR user and/or a VR user having authority to deviate from at least some of the standard rules or procedures (a "manager user").

In some embodiments, each avatar may be selectively configurable, thereby allowing each VR user to personalize a respective avatar. In this way, each VR user can select one or more unique attribute for a respective avatar so that such avatar is more recognizable and/or memorable to one or more other VR user. In some embodiments, each avatar includes one or more feature for assisting other VR users in determining a classification or other attribute of such avatar and/or of a VR user associated with such avatar, such as a standard feature associated with similarly classified avatars. In some embodiments, the standard feature is a name badge, a shirt, a hat, or other feature indicating that the avatar is, for example, a customer avatar, a resource avatar, a specialist avatar, a manager avatar, or some other type of avatar.

In some embodiments, the virtual world includes a plurality of virtual buildings, virtual rooms, and/or other virtual representations of physical locations (herein each a "virtual room"). In some embodiments, the virtual world includes a plurality of virtual tables, virtual counters, virtual signs, virtual boards, or other virtual representations of physical objects (each a "virtual object"). In some embodiments, a first VR user can initiate a virtual conversation with second VR user by directing a first avatar associated with the first VR user to approach a second avatar associated with the second VR user and/or by directing the first avatar to approach one or more virtual object associated with the second avatar and/or the second VR user. In some embodiments, the VR Platform allows VR users, such as the first and second VR users, to share information with each other (herein a "virtual conversation"). In some embodiments, a virtual conversation can include sharing information through voice communication, text communication, sharing of documents, or any other means of sharing information within the VR Platform. In some embodiments, a virtual conversation is a secured or otherwise private conversation between two or more VR users. As will be further described herein, in some embodiments, the first VR user may also be able to initiate a virtual conversation with a non-VR user.

In some embodiments, a first virtual conversation between first and second VR users can be expanded by adding a third and/or fourth VR user, such as a customer user and/or an employee user. In some embodiments, the first and/or second VR user can request the third and/or fourth VR user to join the first virtual conversation. In some embodiments, the third and/or fourth VR user can request to join the first virtual conversation. In some embodiments, the first, second, third, and/or fourth VR users can leave the first conversation, thereby contracting the first virtual conversation. In some embodiments, one or more VR users, such as the first, second, third, and/or fourth VR user, can initiate a second virtual conversation with one or more other VR users and/or can terminate the first virtual conversation. It will be appreciated that a number of virtual conversations between a number of VR users can be initiated, expanded, contracted, and/or terminated in a number of ways.

In some embodiments, the VR Platform provides a visual representation of when a first VR user, such as a customer user, would like to initiate and/or join a virtual conversation. In some such embodiments, the VR Platform provides a visual representation of a first avatar associated with the first VR user standing at a virtual counter, sitting at a virtual table, raising a virtual arm, and/or otherwise interacting with the virtual world in such a way as to provide a visual indication to a second VR user that the first VR user requires and/or otherwise desires assistance. In some embodiments, the VR Platform provides the second VR user and/or a third VR user with a list of customer users requesting assistance. In some embodiments, the VR Platform further provides the second and/or third VR user with information associated with the first VR user, such as a customer profile and/or other history, including status of current concerns and history of previous concerns, if any.

In some embodiments, the VR Platform provides one or more visual indicator of an ongoing virtual conversation. In some such embodiments, the VR Platform provides a visual representation of two or more avatars standing face to face, such as if in engaging in a conversation, and/or standing or sitting at the same virtual object, such as a virtual table, a virtual counter, or the like. In this way, VR users associated with a first virtual conversation are provided with a visual representation of each of the other VR users associated with the first virtual conversation. In some embodiments, VR users associated with the virtual room but not associated with the first virtual conversation are provided with a visual representation of each VR user associated with the first virtual conversation, thereby providing an indication that such VR users are currently unavailable for a separate virtual conversation. In some embodiments, a status of a virtual room (i.e. busy, not busy, understaffed, overstaffed, etc.) can be determined based on the number of employee avatars associated with a virtual conversation and a number of customer avatars waiting to be associated with a virtual conversation and/or otherwise interacting with the virtual room. In this way, a customer user can utilize visual ques to assist the customer user in determining whether to direct his or her respective customer avatar to remain in the virtual room to wait for assistance or whether to direct the respective customer avatar to leave the virtual room. Similarly, a manager user can utilize visual ques to assist the manager user in determining whether to instruct employee users to direct their respective employee avatars to join the virtual room and/or whether to authorize one or more employee user to direct their employee avatar to leave the virtual room, thereby allowing the employee user to take a break, end a work shift, or provide assistance in one or more other virtual room of the VR Platform.

In some embodiments, the VR Platform is a web-based software program that in some cases may be implemented in the cloud and that is configured to send and receive data transmissions to and from one or more VR devices (e.g., during, for example, a "VR session"). In some embodiments, the VR Platform is associated with a gatekeeper system for restricting access to the VR Platform and/or for determining requirements and/or preferences associated with a VR session. In some embodiments, the gatekeeper system verifies that the VR device meets certain minimum standards prior to allowing the VR user to initiate a VR session and/or otherwise access the VR Platform with the VR device. In some embodiments, the gatekeeper system includes an authentication system for receiving and authenticating credentials of each VR user, such as user id's and/or passwords. In some embodiments, the authentication system provides each VR user and/or VR device with a session code and/or one or more other authorization code, thereby allowing the VR user and/or VR device to initiate and/or maintain a VR session.

In some embodiments, the VR Platform is associated with one or more databases for storing information associated with one or more VR users, such as user profile information (e.g., user name, user alias, associated avatar characteristics, user classification, or the like) and/or system information (e.g., available virtual rooms, status and/or classifications of other users, or the like). In some embodiments, the VR Platform is associated with a processor for data communication with the one or more databases. Such a processor may be configured to retrieve information from and store information to such databases, thereby facilitating initiation, execution, and termination of one or more VR sessions for one or more VR users. In some embodiments, one or more such processors are configured to facilitate initiation, execution, and/or termination of one or more interface sessions. As will be further described herein, an interface session is a session where, for example, a first user via a first-type of platform (e.g., a VR platform) interacts with a second user via a second-type of platform (e.g., a non-VR Platform).

Example App Platforms

In some embodiments, the App Platform is an application-based software program that may be executed by one or more processors and that is configured to send and receive data transmissions to and from one or more App devices (e.g., during, for example, an "App session"). As will be further described herein, the App Platform may also be configured to send and transmit data with a VR platform or other types of platforms. In some embodiments, the App Platform may be implemented by an "App device," which may be a mobile device such as a smartphone, a tablet computer, a smartwatch, and so forth. Alternatively, the App Platform may be a cloud-based platform. In some embodiments, the App Platform is associated with a gatekeeper system for restricting access to the App Platform and/or for determining requirements and/or preferences associated with an App session. In some embodiments, the gatekeeper system verifies that an App device meets certain minimum standards prior to allowing the associated App user (i.e., user associated with the App device) to initiate an App session and/or otherwise access the App Platform with the App device. In some embodiments, the gatekeeper system includes an authentication system for receiving and authenticating credentials of each App user. Referring to FIG. 1, some embodiments of the App Platform require an App user to enter a username and/or password, such as on a login screen displayed by an App device, which in this case, is a smartphone. In some embodiments, the authentication system provides each App user and/or App device with a session code and/or one or more other authorization code, thereby allowing the App user and/or App device to initiate and/or maintain an App session.

In some embodiments, the App Platform is associated with one or more databases for storing information associated with one or more App users, such as user profile information (e.g., user name, user alias, user classification, or the like) and/or system information (e.g., system status). In some embodiments, the App Platform is associated with a processor for data communication with the one or more databases. Such a processor may be configured to retrieve information from and store information to such databases, thereby facilitating initiation, execution, and/or termination of one or more App sessions for one or more App users. In some embodiments, one or more such processors are configured to facilitate initiation, execution, and/or termination of one or more interface sessions.

Example Interface Session from the Perspective of an App Platform

In some embodiments, the App Platform includes an interface protocol for allowing an App user to initiate and/or participate in an interface session with one or more other platforms, such as a VR Platform (each other platform being a "Reference platform"). In some embodiments, the interface protocol includes a selection protocol for allowing an App user to select one or more options associated with the interface session.

Figure 2:
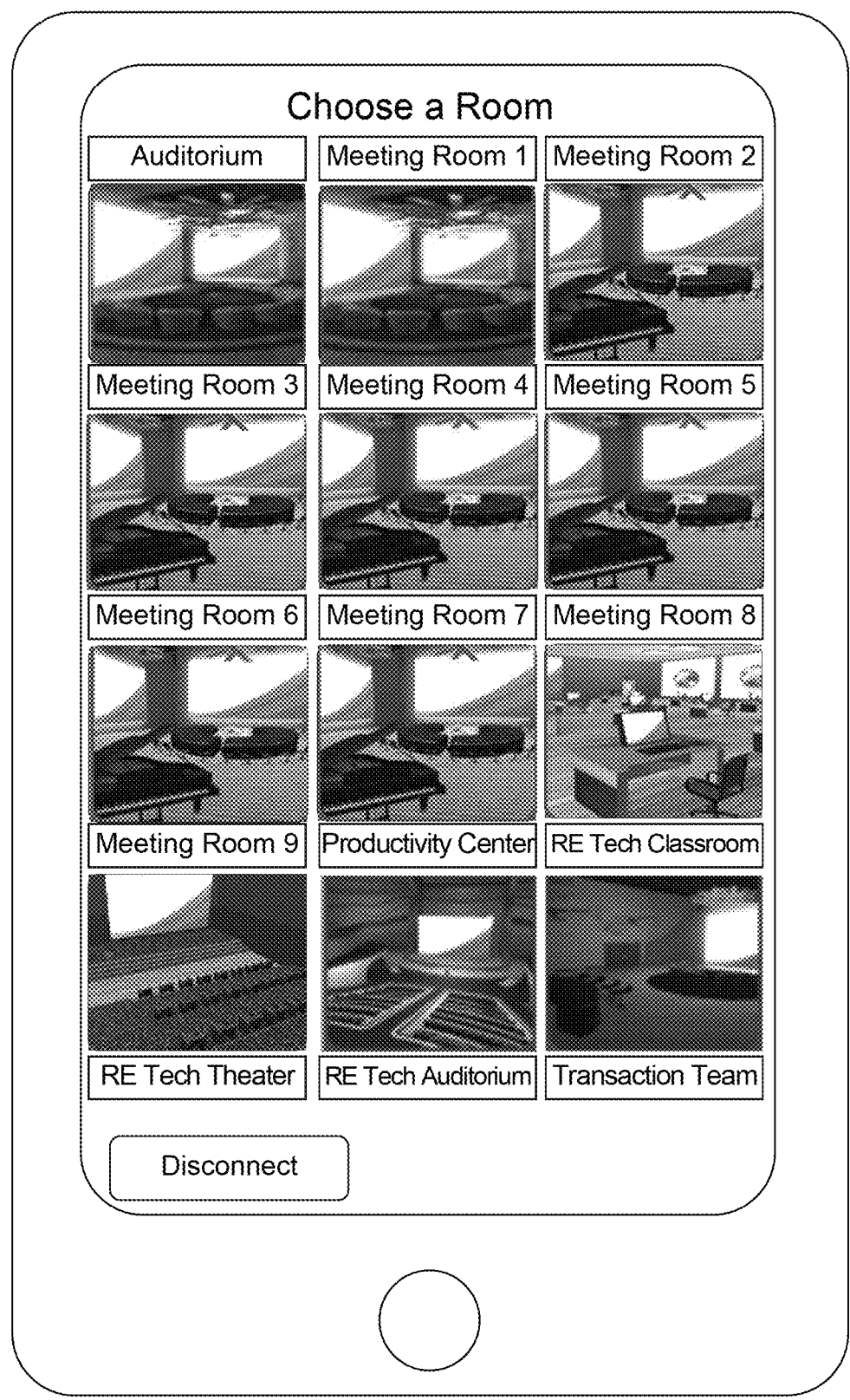
FIG. 2 illustrates the App device of FIG. 1 displaying a selection screen within the App Platform, the selection screen showing a grid of images, each image being associated with a virtual room of a virtual reality platform (a "VR Platform"), in accordance with some embodiments.

Referring to FIG. 2, some embodiments of the selection protocol cause the App device to display a selection screen. In some embodiments, the selection screen shows a grid of images. For these embodiments, each image may be associated with a Reference Platform. For example, in the embodiment illustrated in FIG. 2, each image corresponds to a "channel" that is associated with or linked to a particular virtual room of a virtual world generated by a VR Platform and/or another discrete feature of the Reference Platform (each a "Reference room"), such as through one or more native use of the Reference Platform (i.e., a "Reference session"), thereby allowing an App user to target a specific portion of the Reference Platform within which to create an interface session. By selecting one of the images (i.e., channels), the App user may select which virtual or Reference room to enter when, for example, the Reference Platform is a VR Platform that provides a virtual world with multiple rooms.

In some embodiments, the App user may also be a user of the Reference Platform such that the App user is familiar with one or more various features, such as Reference rooms, of the Reference Platform. In some embodiments, the interface protocol obtains information from the Reference Platform associated with the App user's prior or current interactions with the Reference Platform, thereby allowing the interface protocol to provide suggested actions to the App user through the App device. In some embodiments, the interface protocol highlights one or more images of the grid of images, thereby indicating that the image is associated with one or more Reference rooms the App user was previously and/or is currently associated with through an interface session, within the Reference Platform, or otherwise. In this way, the App user can transfer an active conversation from a Reference session to an interface session, or vice versa, and/or can reestablish a conversation within a Reference session and/or interface session regardless of which session the conversation originated within, thereby creating continuity between such sessions and/or conversations. For example, suppose a first user begins a Reference session with a second user where the first and second users are conducting the Reference session using the same Reference platform (e.g., VR platform) via desktop computers in their offices. If the first user decides to leave his office, the first session can continue participating in the session by switching over to an interface session conducted through the first user's mobile device (e.g., via App platform).

Figure 3:
FIG. 3 illustrates the App device of FIG. 1 displaying information about a virtual room selected by the App user, the information indicating the existence of other users associated with the virtual room, the mobile device further displaying a functional interface feature (i.e., a button indicating "Join Room") for allowing the App user to initiate an interface session with the VR Platform for sharing information with a user of the VR Platform (a "VR user") or to otherwise allow the App user to request initiation of such an interface session, in accordance with some embodiments.

Referring to FIG. 3, in some embodiments, the interface protocol causes the App device to display information about a Reference room selected by the App user. In some embodiments, the information includes a name of the Reference room, one or more image associated with the Reference room, and/or information indicating the existence of other users associated with the Reference room.

In some embodiments, the interface protocol causes the App device to display a functional interface feature and/or otherwise provide the App user with an option for associating the App device and/or the App user with the Reference Platform and/or a specific Reference room associated with the Reference Platform. In some embodiments, the functional interface feature is a virtual button displayed on a touchscreen of the App device. In some embodiments, a virtual button includes one or more messages or other designation, such as an indication that selecting the virtual button will allow the App user to "join" the Reference room and/or an ongoing conversation associated with the Reference Platform and/or otherwise allow the App user to interface with the Reference Platform and/or with other users associated with the Reference Platform. In this way, the interface protocol allows the App user to create and/or join an interface session, to request the Reference Platform to create an interface session and/or to connect the App user with an existing interface session, and/or to request a user of the Reference Platform to create an interface session and/or to add the App user to an existing interface session. In some embodiments, the App device provides instructions for the App user for assisting the App user in creating and/or joining an interface session and/or for requesting the same. In some embodiments, such instructions include instructing the App user to enter information, such as a name, a code, or the like, and/or instructing the App user to perform one or more actions, such as selecting one or more virtual or physical button associated with the App device.

Figure 4:
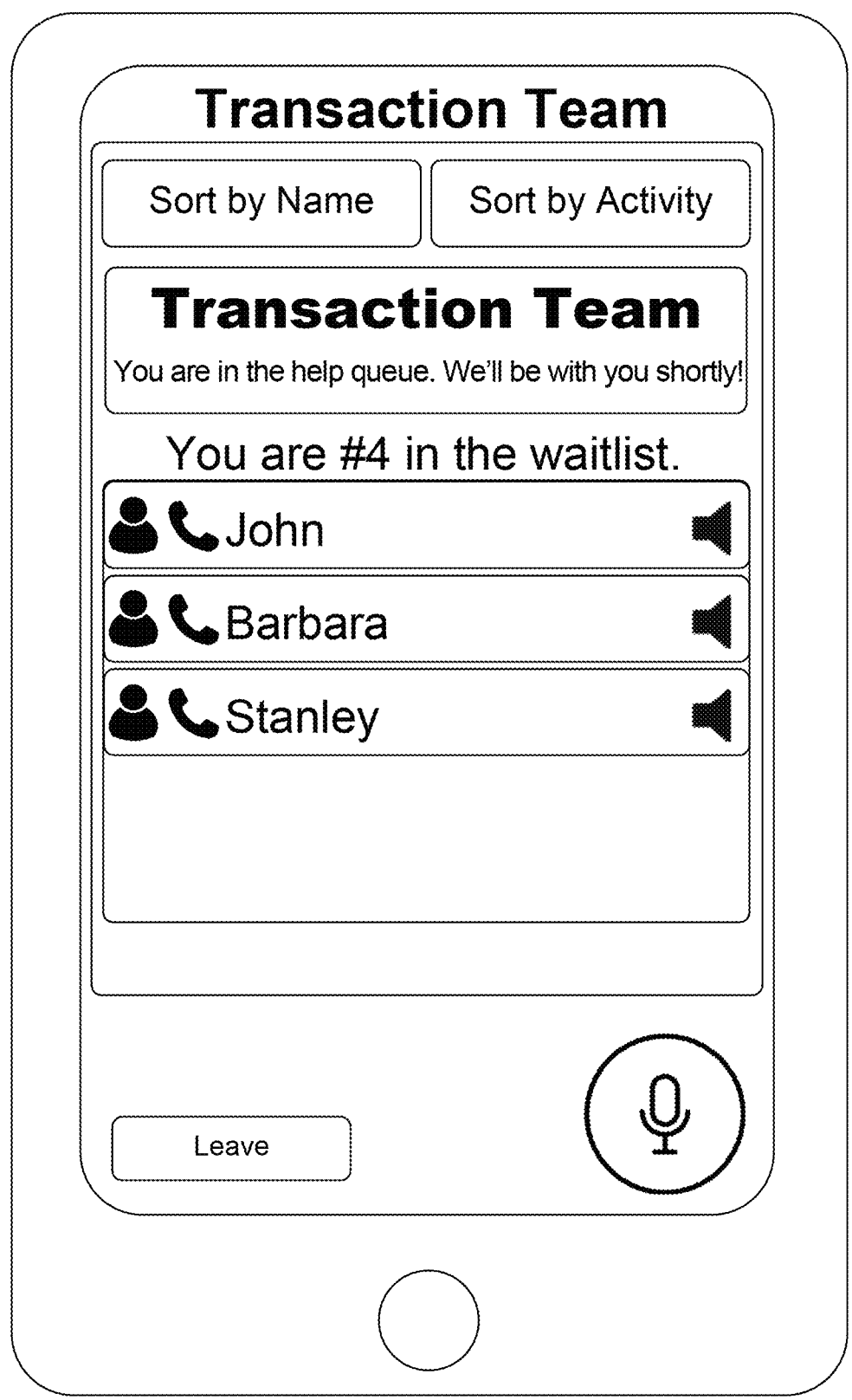
FIG. 4 illustrates the App device of FIG. 1 displaying information about the virtual room selected by the App user, the information indicating the status of the App user and/or the interface session of the App user relative to other users and/or interface sessions associated with the virtual room, the mobile device further displaying a functional interface feature (i.e., a button indicating "Leave") for allowing the App user to terminate an interface session or to withdraw a request for an interface session to be initiated, as applicable, in accordance with some embodiments.

Referring to FIG. 4, some embodiments of the interface protocol cause the App device to display information about one or more services associated with the Reference Platform, such as a service associated specifically with the Reference room selected by the App user. In some embodiments, the interface protocol causes the App device to display information associated with the App user's status within the Reference Platform and/or within a selected Reference room, such as the App user's position on a waitlist associated with the Reference Platform, a status of an interface session, and/or an estimated time the App user can expect to wait for assistance and/or for an interface session to be created.

In some embodiments, the interface protocol causes the App device to display information associated with an employee user and/or a team of employee users associated with the Reference Platform and/or a Reference room of the Reference Platform, thereby providing the App user with an indication of whether such user and/or team of users will be able to provide desired services. In some embodiments, the interface protocol causes the App device to provide a general description of the team of users (e.g., an indication that a "Transaction Team" or some other such team is associated with the Reference Platform and/or the Reference room), information pertaining to one or more specific user (i.e., whether a user is a reference user, a specialist user, a manager user, or the like and/or some other indication of a classification and/or credential of the user), information pertaining to the App user's prior interactions with one or more users (e.g., through an interface session or otherwise), or the like.

In some embodiments, the interface protocol causes the App device to display a functional interface feature and/or otherwise provide the user with an option for disassociating the App device and/or the App user from the Reference room. In some embodiments, the functional interface feature is a virtual button displayed on a touchscreen of the App device. In some embodiments, a virtual button includes one or more message or other designation, such as an indication that selecting the virtual button will allow the App user to "leave" the Reference room and/or otherwise allow the App user to terminate an interface session or to retract a request for the creation of an interface session, as appropriate. In some embodiments, the App device provides instructions for the App user for assisting the App user in withdrawing a request for an interface session to be initiated, for terminating an interface session, and/or for requesting the same. In some embodiments, such instructions include instructing the App user to perform one or more action, such as selecting one or more virtual or physical button associated with the App device.

Figure 5:
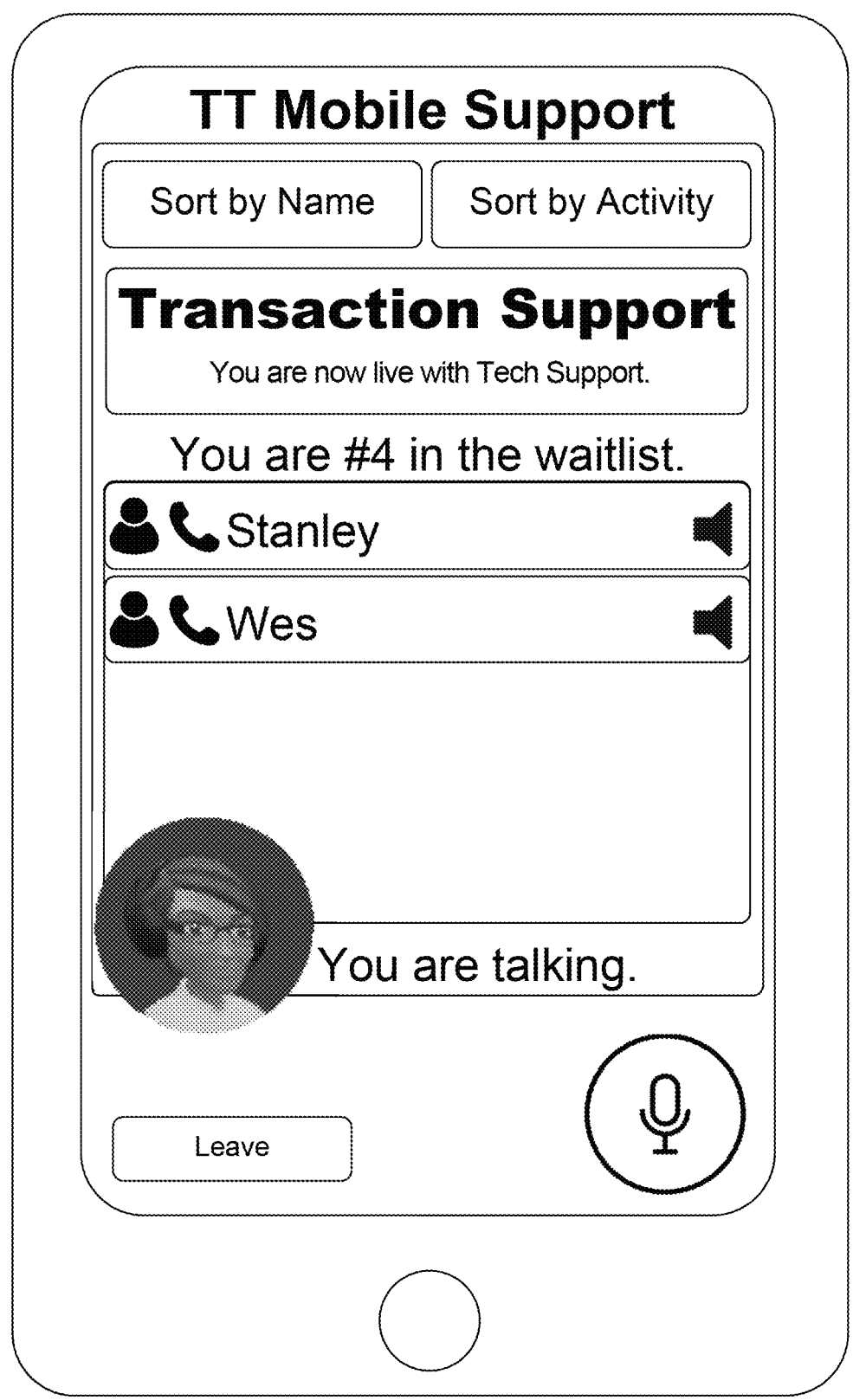
FIG. 5 illustrates the App device of FIG. 1 displaying an avatar of the VR user, the App device (e.g., mobile device) further displaying an indication of an active interface session between the App user and the VR user (i.e., a banner indicating "You are now live with tech support."), in accordance with some embodiments.

Referring to FIG. 5, some embodiments of the interface protocol cause the App device to display information about one or more active interface sessions, such as a status of the interface session (i.e., a banner indicating "You are now live with tech support."). In some embodiments, the interface protocol causes the App device to display an image associated with a user of the Reference Platform, such as an image of an avatar associated with such user. In some embodiments, the image is configured so as to create in the mind of the App user an association between the interface session and a prior and/or subsequent Reference session and/or interface session and/or associated conversation, thereby increasing continuity between such sessions and/or conversations.

In some embodiments, the interface protocol causes the App device to display a functional interface feature and/or otherwise provide the user with an option for communicating during an interface session. In some embodiments, the functional interface feature is a virtual button displayed on a touchscreen of the App device. In some embodiments, the virtual button includes one or more message or other designation, such as an indication that selecting the virtual button will allow the App user to speak to a user of the Reference room and/or otherwise communicate with the same, such as by sharing files and/or messages through the interface session. In some embodiments, the App device provides instructions for the App user for assisting the App user in providing information to and/or receiving information from the Reference Platform. In some embodiments, such instructions include instructing the App user to perform one or more actions, such as selecting one or more virtual or physical button associated with the App device and/or selecting and/or creating one or more image, message, file, folder, or other collection of digital information.

Example Interface Session from the Perspective of a VR Platform

In some embodiments, the VR Platform employs an interface protocol for allowing a VR user to initiate and/or participate in an interface session with one or more other platforms, such as an App Platform (for purposes of the following each of the other platforms being a "Reference Platform"). In some embodiments, the interface protocol includes a selection protocol for allowing a VR user to select one or more options associated with an interface session.

Figure 6:
FIG. 6 is a screenshot taken from a VR device showing the avatar of the VR user during a virtual reality session, the screenshot further showing an indication of a capability of creating or joining an interface session between the VR Platform and the App Platform (i.e., a banner indicating "Mobile Support ON") while also providing an indication that users of the App Platform have initiated or would like to initiate an interface session (i.e., a list of mobile users displayed on a wait list), in accordance with some embodiments.

Referring to FIG. 6, some embodiments of the selection protocol are associated with a virtual object and/or one or more other indications of one or more users of one or more Reference Platforms (a "Reference user") requesting to communicate with one or more VR users and/or to otherwise interface with the VR Platform through an interface session. In some embodiments, the virtual object is a virtual board that lists identifiers (e.g., names or other indications) of one or more Reference users and/or VR users waiting for assistance, thereby providing other VR users with a visual representation of a backlog of users waiting for assistance. In some embodiments, the virtual board indicates an estimated wait time for each user.

In some embodiments, the estimated wait time is calculated based on the type of services requested by the respective user, the number of users ahead of the respective user on the wait list, the number of employee users currently assisting other VR users and/or Reference users, and/or one or more other factors. In some embodiments, the position of each user on the wait list is determined based on a reservation made by such user, based on a time such user was added to the wait list, and/or based on one or more other factor. For example, the position of a VR user can be determined based at least in part on a time when the VR user obtains a ticket from a ticket machine, as illustrated in FIGS. 16B and 16C; the position of a non-VR App user can be determined based at least in part on a time when the App user selects a channel (virtual or Reference room) to enter. In some embodiments, the wait list includes different identifiers (in shape, color, size, font, a combination of the same or the like) to differentiate VR user(s) from non-VR user(s), to classify users based on the type of services requested, or to signal different priorities of users. One of the benefits of having such a list is that those Reference users who are using a non-VR platform may still participate in the virtual room by simply being listed in such a list without the need for having a corresponding avatar, at least initially, in the virtual room (e.g., a VR user whose avatar is in the virtual room may select a Reference user for an interface session by selecting the Reference user's name on the list).

Figure 11:
FIG. 11 is a screenshot showing a visual indication of inability to create or join an interface session between the VR Platform and the App Platform (i.e., a banner indicating "Mobile Support OFF"), in accordance with some embodiments.
Figure 12:
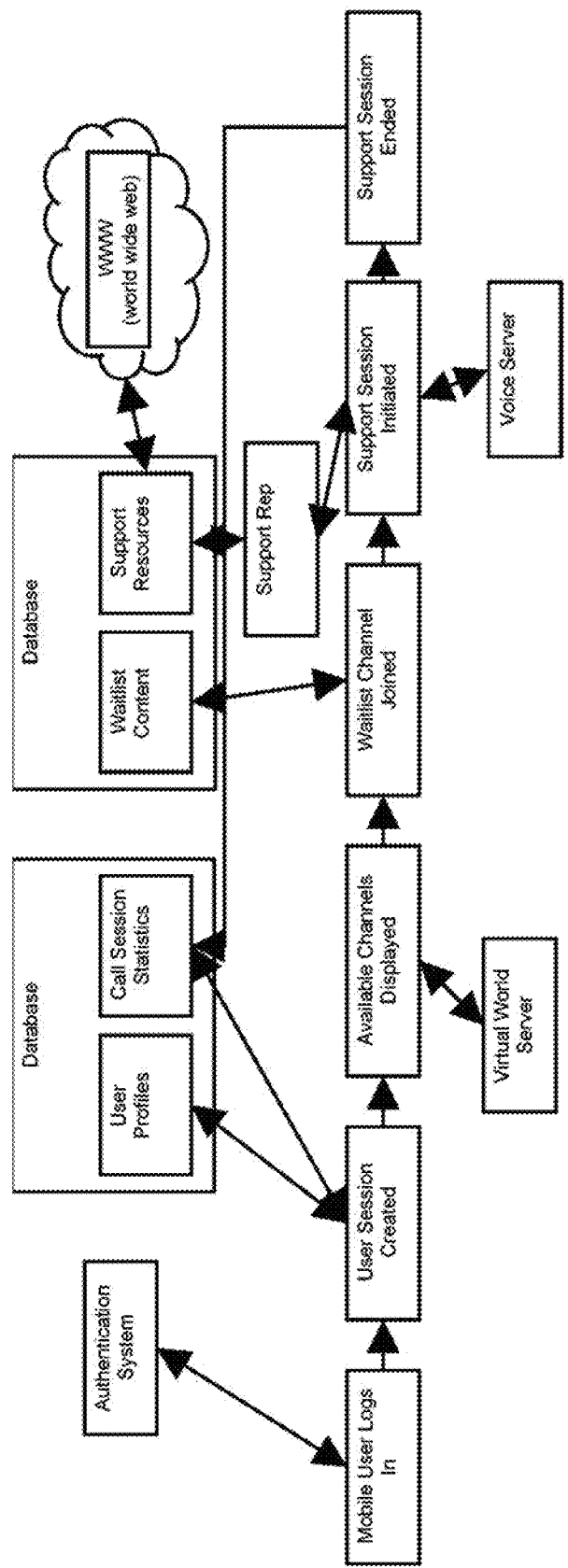
FIG. 12 is a flow chart of an example method of the presently disclosed technology, in accordance with some embodiments.

In some embodiments, the interface protocol allows an employee user of the VR Platform to initiate an interface session (or to join an interface session, as applicable), such as by utilizing the selection protocol to select a Reference user from the wait list and/or by otherwise indicating a desire to initiate a virtual or other such conversation with such Reference user. In some embodiments, a manager user, another VR user, and/or some other person or system can enable the creation and/or continuation of one or more interface sessions by toggling a feature of the VR Platform to allow and/or enable and/or to prevent and/or prohibit such creation and/or continuation of such sessions. Still referring to FIG. 6, some embodiments of the VR Platform provide a visual indicator, such as a virtual object and/or other system display, for indicating when creation and/or continuation of an interface session is permitted and/or possible (e.g., a banner indicating "Mobile Support On"). Referring to FIG. 11, some embodiments of the VR Platform are configured to provide a visual indicator for indicating when creation and/or continuation of an interface session is not possible and/or is not permitted (e.g., a banner indicating "Mobile Support OFF").

Figure 7:
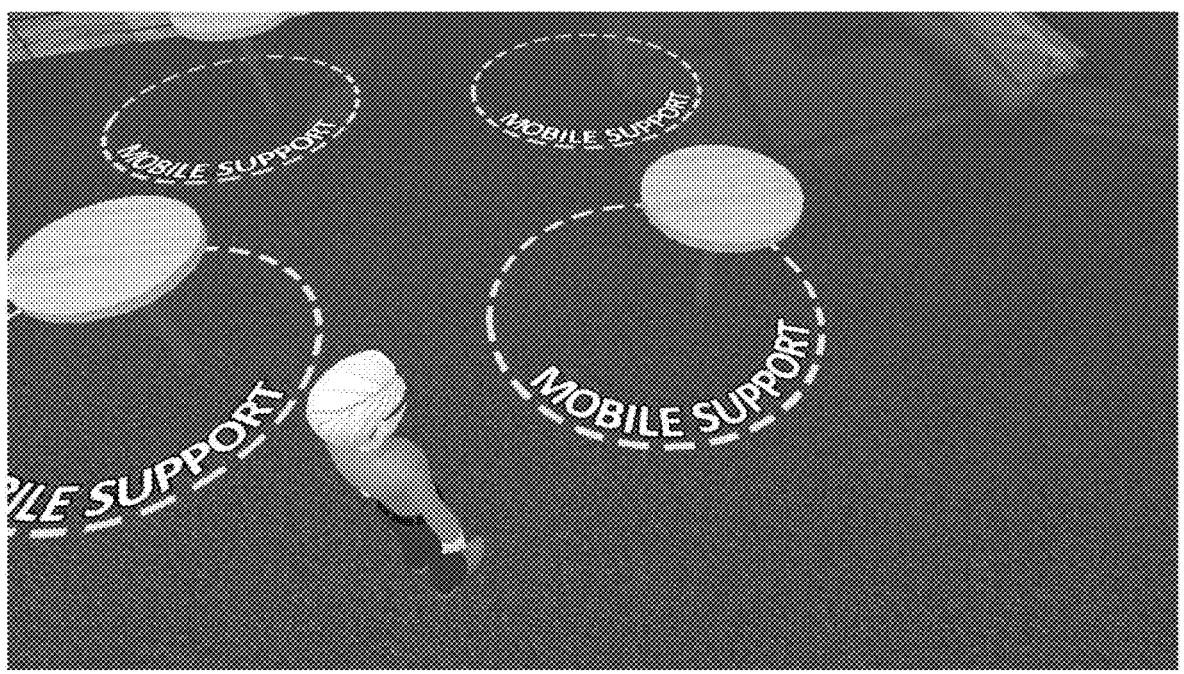
FIG. 7 is a screenshot taken from the VR device showing a virtual object in the form of a small table and a visual indicator (i.e., a green circle and the text "MOBILE SUPPORT") positioned adjacent to the virtual object, the visual indicator providing an indication that the virtual object is associated with or is otherwise capable of being associated with an interface session, in accordance with some embodiments.

Referring to FIG. 7, some embodiments of the VR Platform include a virtual object and/or one or more other visual indicator associated with the interface protocol and/or one or more interface sessions. In some embodiments, the virtual object is a virtual representation of a physical table and/or a virtual representation of another such physical object. In some embodiments, the visual representation includes an indication that the virtual object and/or a region of the virtual world is associated with and/or is capable of being associated with one or more interface sessions (e.g., a green circle and/or text indicating "MOBILE SUPPORT"). In some embodiments, initiating and/or joining an interface session by a VR user, such as by an employee user, includes such VR user directing an avatar of such VR user towards such virtual object and/or other region of the virtual world, thereby associating such avatar with such virtual object and/or region. In some embodiments, the VR user indicates a willingness and/or desire to create and/or join an interface session with one or more Reference users, thereby causing a respective avatar of such VR user to move into virtual engagement with an associated virtual object and/or region of the virtual world and/or to otherwise create a visual indication that such VR user is associated with such interface session.

Figure 8:
FIG. 8 is a screenshot taken from the VR device showing the avatar positioned adjacent to the virtual object, the screenshot further showing a visual indicator (i.e., a banner indicating "Assist Next Mobile User") for indicating that the VR user will be joining an interface session or initiating an interface session, as applicable, in accordance with some embodiments.

Referring to FIG. 8, some embodiments of the VR Platform enable a VR user to move into engagement with a virtual object and/or a region of the virtual world prior to becoming associated with a specific interface session. In some embodiments, the VR Platform is configured to provide a visual indicator (i.e. a banner indicating "Assist Next Mobile User") or other indication that the VR user can join and/or create one or more interface sessions, as applicable, such as by selecting the next name from a wait list and/or otherwise selecting a name from the wait list.

Figure 9:
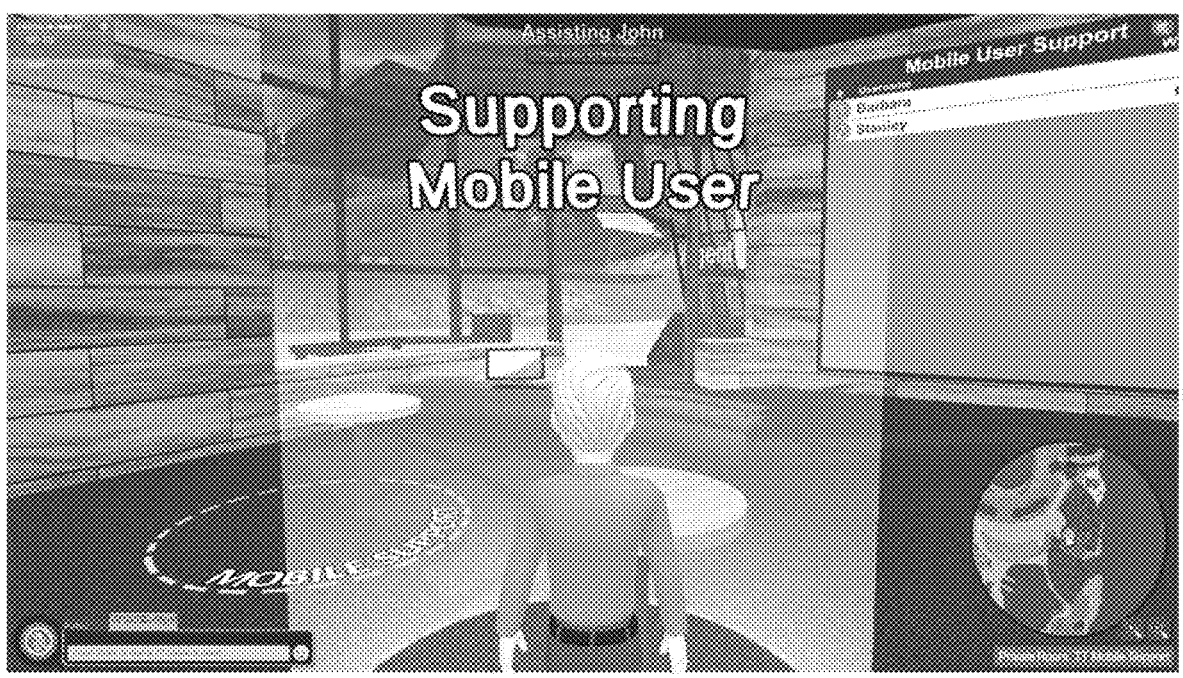
FIG. 9 is a screenshot taken from the VR device showing the avatar positioned adjacent to the virtual object, the screenshot further showing two visual indicators (i.e., a banner indicating "Assisting John" and a green translucent isolation field extending vertically from the green circle) for indicating that the VR user is participating in an interface session, the screenshot further showing a functional interface feature for allowing the VR user to terminate the interface session (i.e., a banner indicating "Dismiss Current Mobile User"), in accordance with some embodiments.

Referring to FIG. 9, some embodiments of the VR Platform provide one or more visual indications that a VR user is in an interface session with an "interface user" (e.g., Reference user). In some embodiments, the visual indication is visible to the interface user, thereby providing confirmation of the existence of the interface session and/or otherwise providing information associated with the interface session. (i.e. a banner indicating "Supporting Mobile User" and/or a virtual isolation field surrounding an avatar of the interface user). In some embodiments, the visual indication includes a name or other designation of a Reference user associated with the interface session (i.e. a banner indicating "Assisting John"). In some embodiments, the visual indication is visible to a VR user other than the interface user, thereby providing an indication to such other VR user that the interface user is currently involved in an interface session and/or is otherwise unavailable within the VR Platform (i.e. a virtual isolation field surrounding an avatar of the interface user).

Figure 10:
FIG. 10 is a screenshot taken from the VR device showing two avatars positioned within the isolation field, each avatar being associated with a different user of the VR Platform, in accordance with some embodiments.

Referring to FIG. 10, some embodiments of the VR Platform are configured to allow one or more VR users to join or leave an interface session, thereby increasing or decreasing a number of interface users, by directing a respective avatar to enter and/or leave an isolation field associated with the Interface Session and/or by otherwise directing the VR Platform to associate and/or disassociate such VR user with the Interface Session. In some embodiments, each VR user having an avatar positioned within a virtual room with an avatar of an interface user is provided with a visual indication of such interface user(s) being associated with a respective interface session. In some such embodiments, the visual indication includes a visual representation of an isolation field surrounding an avatar of one or more respective interface users. In some embodiments, the VR Platform provides a visual representation of independent isolation field and/or other visual indicators for each interface session, thereby giving each VR user within the virtual room a visual indication of the number of interface sessions associated with such virtual room and/or a number of employee users and/or other VR users associated with each such interface session.

In use, the system allows a user to transition between a native session within a first platform, such as a VR Platform, and an interface session between the first platform and a second platform, such as an App Platform. In this way, a user can transition between a first device associated with the first platform (such as an office computer) to a second device associated with the second platform (such as a mobile phone) as required and/or desired, such as when the user transitions from a first location (such as an office) to a second location (such as a vehicle), or vice versa, and/or when circumstances otherwise require. In this way, a user is provided with greater flexibility to utilize one or more platform and/or system and/or to otherwise obtain and/or share information as needed or desired.

Figure 13:
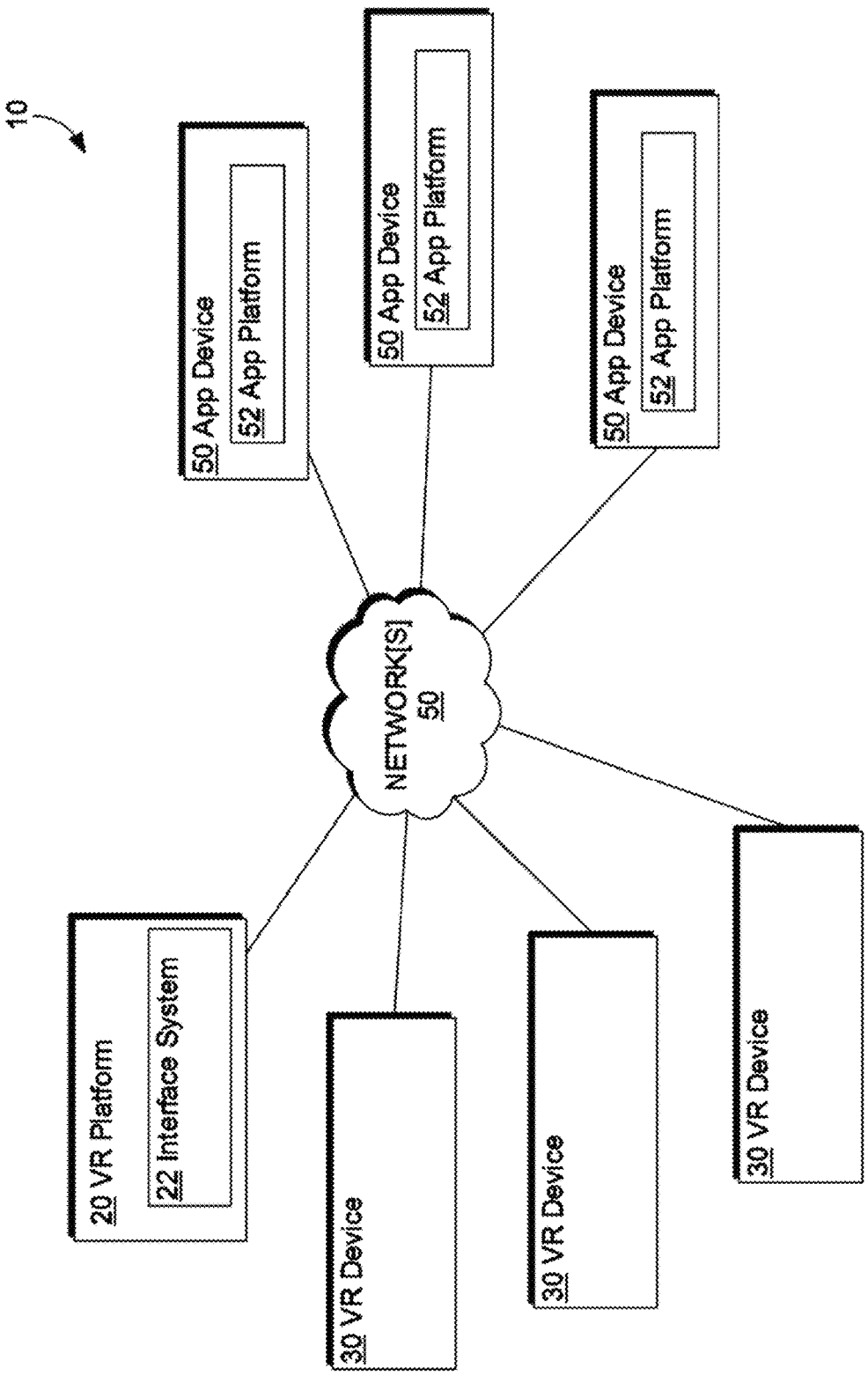
FIG. 13 is a block diagram of an example network environment in accordance with some embodiments.

Referring to FIG. 13, which illustrates an example network environment 10 according to some example embodiments. The network environment 10 includes a VR Platform 20, one or more VR devices 30 (e.g., a desktop computer, a workstation, a gaming device, a mobile device, a dedicated VR device such as a VR headset, and/or the like that can provide virtual reality functionalities), one or more App devices 50 (e.g., computer devices including mobile devices such as smartphone, tablet computer, smartwatch, and/or the like that for some reason is unable to provide VR functionalities), and one or more networks 50 (e.g., one or more wireless and/or wired networks including local area network (LAN), wireless LAN, wide area network (WAN), metropolitan area network (MAN), and/or the like). Each of the App devices 50 may include an App Platform 52, which may be a non-VR platform. Although not illustrated, each of the VR devices 30 may include a client application for communicating with the VR Platform 20. In various embodiments, the VR Platform 20 may be configured to perform at least some of the various operations and functionalities previously described and may include an interface system 22 for interfacing with the App Platforms 52. In some cases, the VR Platform 20 may be a cloud-based system that may employ a plurality of servers, datastores, and so forth. In various embodiments, the VR Platform 20 including the interface system 22 may be implemented by employing one or more programmable circuitry (e.g., one or more processors) executing computer programming instructions (e.g., software). Alternatively, the VR Platform 20 including the interface system 22 may be implemented using Application Specific Integrated Circuit (ASIC). In still other embodiments, the VR Platform 20 including the interface system 22 may be implemented using any combination of programmable circuitry, software, and/or ASIC.

In some embodiments, the interface system 22 may be a standalone network component instead of a module that is integrated into a VR Platform 20 as illustrated in FIG. 13. In some embodiments, the VR Platform 20 may be incorporated into one or more of the VR devices 30 instead of being a cloud-based system as illustrated in FIG. 13.

Figure 14:
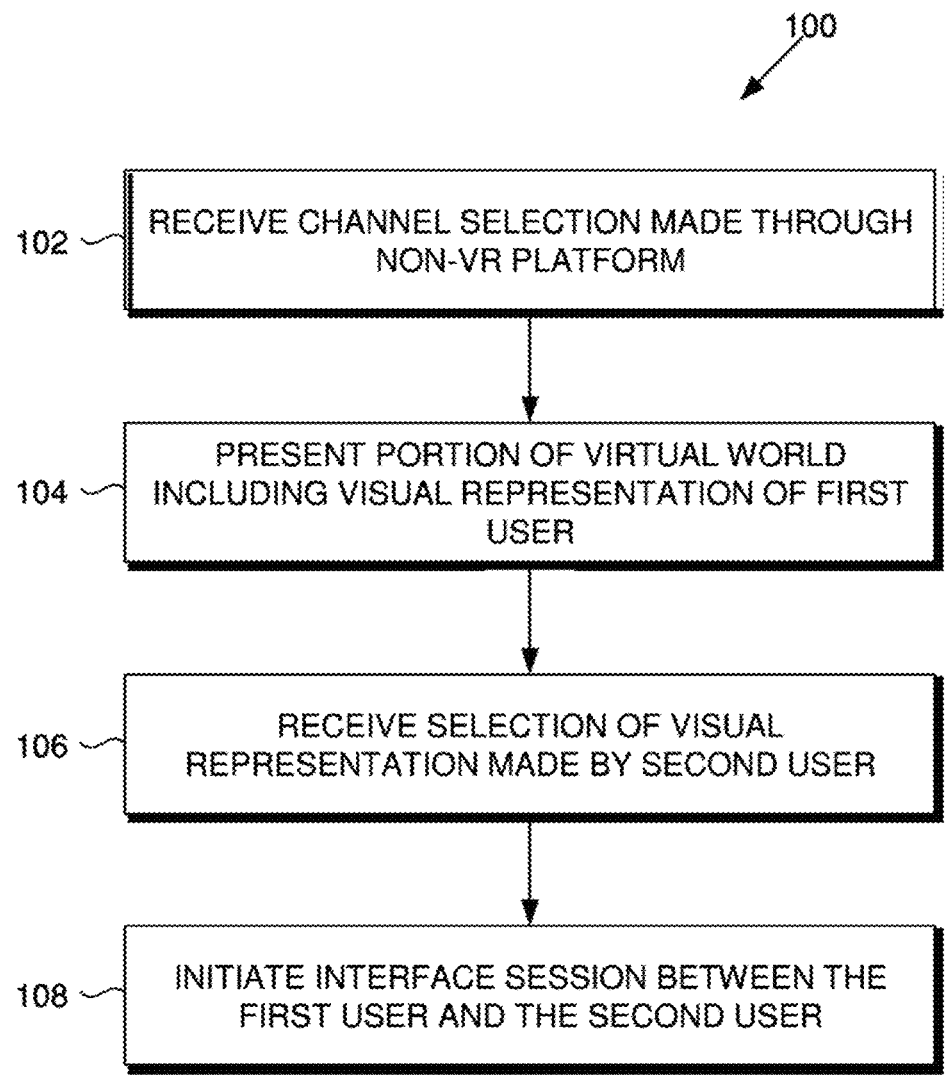
FIG. 14 is an example high-level process for initiating an interface session in accordance with some embodiments.
Figure 15A:
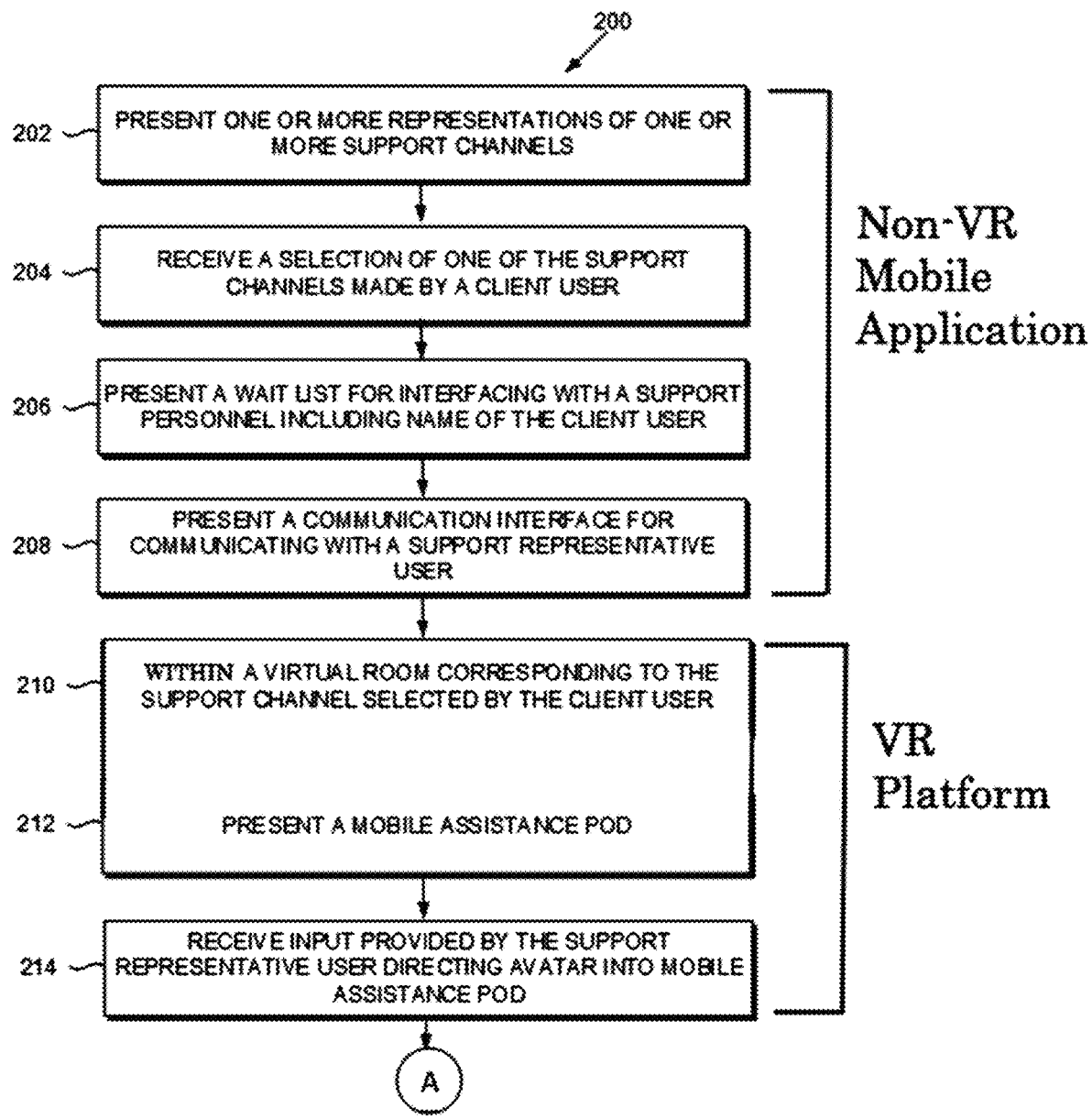
FIGS. 15A and 15B illustrate an example process of the present disclosure for providing a session between a client user of a non-VR mobile application, and a support representative user of the VR platform, in accordance with some embodiments.
Figure 15B:
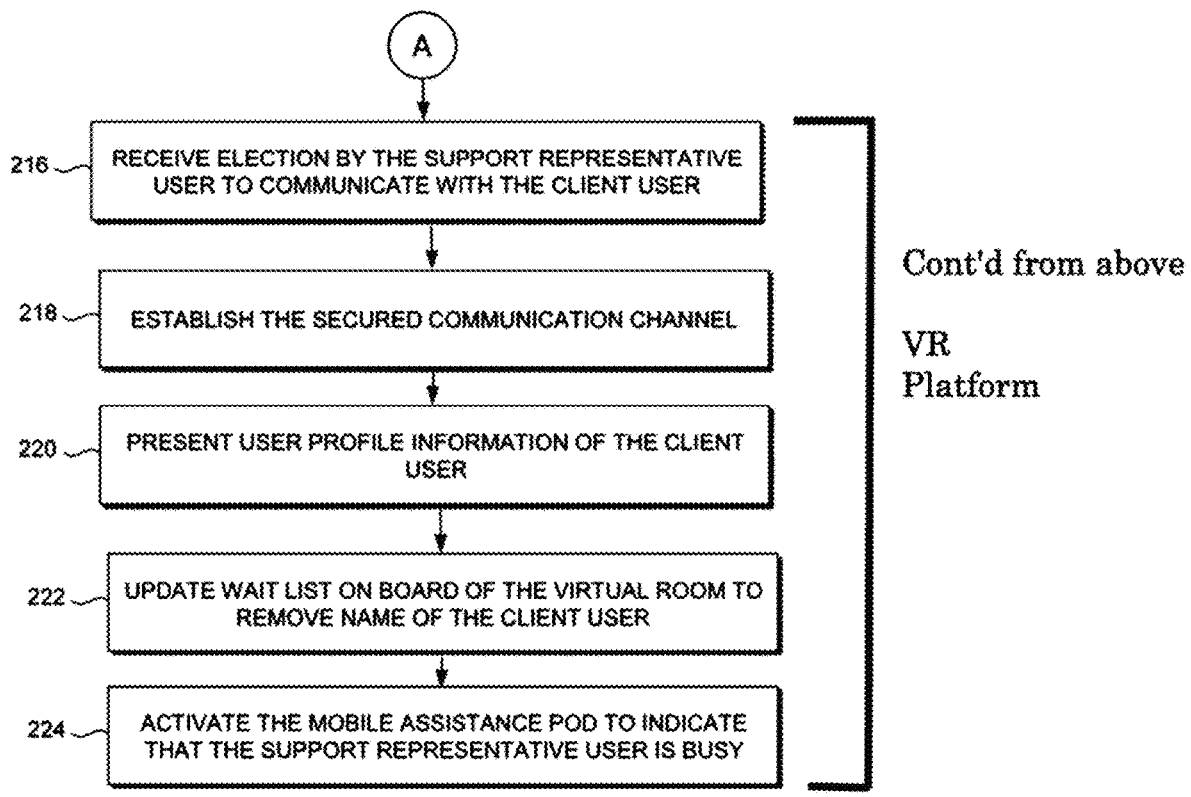

Turning now to FIG. 14, which is a high-level process for initiating and conducting an interface session through a VR platform and through a non-VR platform in accordance with various embodiments. In some embodiments, the process 100 may be implemented by the VR Platform 20 (including the interface system 22) of FIG. 13. For ease of illustration and explanation, process 100 will be described herein with reference to the network environment 10 illustrated in FIG. 13. In at least one embodiment, the process 100 may begin at 102 when a channel (corresponding to a virtual room of a virtual world) selection made by a first user is received through a non-virtual reality (VR) platform. For example, such a selection may be received by the VR Platform 20 (via the interface system 22) and may be made by the first user through one of the App devices 50 (e.g., mobile computing device) via an App Platform 52 (e.g., a non-VR Platform) of FIG. 13.

At 104 at least a portion of the particular area of the virtual world may be presented by the VR platform 20 including a visual representation (e.g., a textual identifier such as a name) of the first user. In some cases, the visual representation of the first user is a textual identifier of the first user that is part of list that includes one or more other textual identifiers of one or more other users, the list providing an indication as to how long each textual identifier has been on the list. In some embodiments, the particular area of the virtual world that is presented may be a virtual room of the virtual world. In some embodiments, the presentation of the at least a portion of the particular area of the virtual world including the visual representation of the first user may include transmission of such data or information to a VR device 30 being used by the second user. In some alternative embodiments, the presentation of the at least a portion of the particular area of the virtual world including the visual representation of the first user may include presenting or displaying, by the VR device 30 being used by the second user, of the at least a portion of the particular area of the virtual world including the visual representation of the first user.

At 106, a selection of the visual representation of the first user and made by a second user via the second computing device (VR device 30) may be received by, for example, the VR Platform 20. In some embodiments, the second user may make the selection by simply directing the second user's avatar to relocate towards or onto a virtual object or to a particular location of the particular area (e.g., a virtual room) of the virtual world. In some embodiments, by simply relocating the second user's avatar to the virtual object or to a particular location, the selection of the visual representation of the first user may be made. In some cases, alternative or additional actions may be needed in order to make the selection (e.g., the avatar points to the visual representation, such as the name, of the first user, or highlights the name of the first user). In some embodiments, the visual representation of the first user is a textual identifier (e.g., a name) associated with the first user. For these embodiments, the textual identifier may be included in a list of one or more other textual identifiers of one or more other users, the list providing an indication as to how long each textual identifier has been on the list.

At 108, in response to the reception of the selection of the visual representation of the first user, the VR Platform 20, for example, may initiate an interface session between the first user and the second user. The interface session may permit the first user to communicate with second user via the first computing device (e.g., App Device 50) and the second computing device (e.g., VR Device 30), where the first user accesses the interface session through the non-VR platform (e.g., App Platform 52) and the second user accesses the interface session through the VR platform 20.

In some embodiments, the initiating operation may include transmitting to the first computing device (e.g., App Device 50) an indication that the interface session has been initiated and a visual representation (a name, a picture, image of an avatar, or the like) of the second user. In some embodiments, the initiating operation may include presenting to or through a second computing device (e.g., VR device 30) used by the second user to select the visual representation of the first user an avatar associated with the first user in the particular area of the virtual world. In various embodiments, the interface session may include sharing, between the first and second computing devices (e.g., between app device 50 and AR device 30) information through voice communication, text communication, or fir exchange.

Figure 16A:
FIGS. 16A-16N are screenshots associated with example process flows and perspectives in accordance with some embodiments of the presently disclosed technology.
Figure 16B:
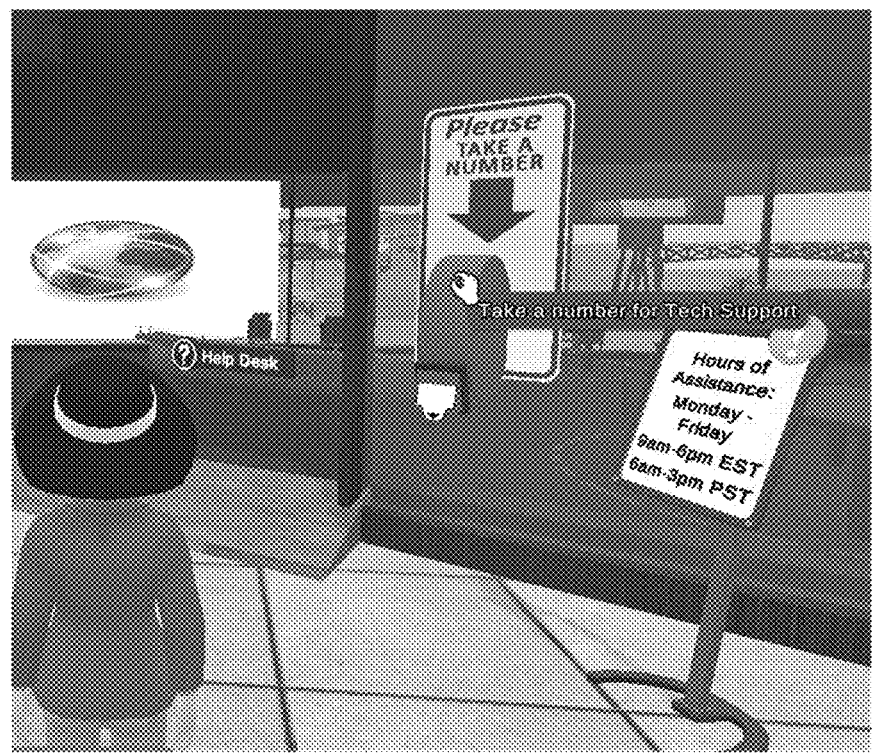
Figure 16C:
Figure 16D:
Figure 16E:
Figure 16F:
Figure 16G:
Figure 16H:
Figure 16I:
Figure 16J:
Figure 16K:
Figure 16L:
Figure 16M:
Figure 16N:

FIGS. 16A-16N are screenshots associated with example process flows and perspectives in accordance with some embodiments of the presently disclosed technology, as described below:

Process Flow

End User Perspective

1. See FIG. 16A—The user logs into the 3D virtual world
   a. The user logs in with secure credentials to the authentication system. This initiates a request to the user database to attach the user profile and session history.
2. See FIG. 16B—Navigate to a location for assistance
   a. Hover cursor on ticket machine outside location.
3. See FIG. 16C—The user selects to get in the queue by left clicking on the ticket machine and entering a support channel.
   a. Support channel selection initiates a request for the support channel resources configuration
   b. A ticket is visible to the user with the position in the wait queue, the number decreases as the queue is serviced, so the user knows their current position
   c. Users can also opt to leave the waitlist
4. See FIG. 16D—While the user is waiting in the queue they can go anywhere in the desktop application
   a. The ticket will always be on the screen until they are helped or they log out
   b. Users can only be in one queue at a time
5. See FIG. 16E—The user avatar is moved to a seat at a table across from the avatar of the support representative supporting them, they are also moved to a new voice channel when they are helped
   a. A support representative initiates a session with the user that "teleports" the avatar to a seat across from them.
   b. This creates a secure channel in the TeamSpeak voice server to serve the conversation.

c. The user is removed from the wait queue.
6. See FIG. 16F—When the discussion is over the user is moved back to the entrance of the building, near where they took the initial ticket and can go about the rest of their business
7. See FIG. 16G—Users can also opt out of the waitlist by clicking on the "Leave Waitlist" button under the ticket on the right of the screen.
   a. After confirming they would like to leave the waitlist they are removed from the queue
   b. They can also opt out by closing or logging out of the application Support Representative Perspective
1. See FIG. 16H—The support representative logs into the 3D virtual world
   a. The support representative logs in with secure credentials to the authentication system. This initiates a request to the user database to attach the user profile and session history.
2. See FIG. 16I—Support representative navigates to the location they will be providing support
   a. When the support representative's avatar enters the building his/her credentials are verified for the sufficient access level to assist users.
   b. Upon entering they will sit at a chair at a table within a secure voice channel
   c. Here they can view the current number of users in the queue awaiting help
3. See FIG. 16J—Clicking on the "Serve Next" button under the waitlist will bring the next user in the queue to the seat directly across the table from the support staff and remove that user from the queue.
   a. The support representative can then speak or type to assist the user
4. See FIG. 16K—If the user has stepped away from their computer or is not responding, the support representative can sent them back to the end of the queue
   a. This moves the avatar back outside the building and puts them back in the queue
   b. The support representative can then assist other users in the queue
5. See FIG. 16L—When the discussion is complete the support representative can "Dismiss" the user back to the front of the building and proceed to support the next user in the queue.

Features not Covered Above
See FIG. 16M—Multiple support representative support
   If a support representative needs support from a manager or colleague, that user can walk over and sit at the table provide additional support
See FIG. 16N—Multiple agent support
   If a group of agents are looking for the same help and have come together they can walk over and sit at the table after the first person is moved from the queue to the table to participate in the support process.

Various embodiments of the computer programs, devices, systems, and methods of the present disclosure may be implemented in hardware, software, firmware, or combinations thereof, which broadly comprises server devices, computing devices, communication networks, and so forth. Various embodiments of the server devices include computing devices that provide access to one or more general computing resources, such as Internet services, electronic mail services, data transfer services, and the like. In some embodiments the server devices also provides access to a database that stores information and data, with such information and data including, without limitation, system user information (e.g. ID, account number, etc.), or the like, or other information and data necessary and/or desirable for the implementation of the computer program, devices, systems, and methods of the present disclosure.

Various embodiments of the server devices and the computing devices include any device, component, or equipment with a processing element and associated memory elements. In some embodiments the processing element implements operating systems, and in some such embodiments is capable of executing the computer program, which is also generally known as instructions, commands, software code, executables, applications (apps), and the like. In some embodiments the processing element includes processors, microprocessors, microcontrollers, field programmable gate arrays, and the like, or combinations thereof. In some embodiments the memory elements are capable of storing or retaining the computer program and in some such embodiments also store data, typically binary data, including text, databases, graphics, audio, video, combinations thereof, and the like. In some embodiments the memory elements also are known as a "computer-readable storage medium" and in some such embodiments include random access memory (RAM), read only memory (ROM), flash drive memory, floppy disks, hard disk drives, optical storage media such as compact discs (CDs or CDROMs), digital video disc (DVD), Blu-Ray™, and the like, or combinations thereof. In addition to these memory elements, in some embodiments the server devices further include file stores comprising a plurality of hard disk drives, network attached storage, or a separate storage network.

Various embodiments of the computing devices specifically include mobile communication devices (including wireless devices), work stations, desktop computers, laptop computers, palmtop computers, tablet computers, portable digital assistants (PDA), smart phones, wearable devices and the like, or combinations thereof. Various embodiments of the computing devices also include voice communication devices, such as cell phones or landline phones. In some preferred embodiments, the computing device has an electronic display, such as a cathode ray tube, liquid crystal display, plasma, or touch screen that is operable to display visual graphics, images, text, etc. In certain embodiments, the computer program of the presently disclosed technology facilitates interaction and communication through a graphical user interface (GUI) that is displayed via the electronic display. The GUI enables the user to interact with the electronic display by touching or pointing at display areas to provide information to the user control interface, which is discussed in more detail below. In additional preferred embodiments, the computing device includes an optical device such as a digital camera, video camera, optical scanner, or the like, such that the computing device can capture, store, and transmit digital images and/or videos, bar codes or other identification information.

In some embodiments the computing devices include a user control interface that enables one or more users to share information and commands with the computing devices or server devices. In some embodiments, the user interface facilitates interaction through the GUI described above or, in other embodiments comprises one or more functionable inputs such as buttons, keyboard, switches, scrolls wheels, voice recognition elements such as a microphone, pointing devices such as mice, touchpads, tracking balls, styluses. Embodiments of the user control interface also include a speaker for providing audible instructions and feedback. Further, embodiments of the user control interface comprise wired or wireless data transfer elements, such as a communication component, removable memory, data transceivers, and/or transmitters, to enable the user and/or other computing devices to remotely interface with the computing device.

In various embodiments a communication network may be wired, wireless, and/or a combination thereof, and in various embodiments includes servers, routers, switches, wireless receivers and transmitters, and the like, as well as electrically conductive cables or optical cables. In various embodiments the communication network includes local, metro, and/or wide area networks, including the Internet and/or other cloud networks. Furthermore, some embodiments of the communication network include cellular and/or mobile phone networks, as well as landline phone networks, public switched telephone networks, fiber optic networks, or the like.

Various embodiments of both the server devices and the computing devices are connected to the communication network. In some embodiments server devices communicate with other server devices or computing devices through the communications network. Likewise, in some embodiments, the computing devices communicate with other computing devices or server devices through the communication network. In various embodiments, the connection to the communication network is wired, wireless, and/or a combination thereof. Thus, in some such embodiments, the server devices and the computing devices include components to establish a wired and/or a wireless connection.

Various embodiments of the computer program of the present disclosure may run on computing devices. In other embodiments the computer program may run on one or more server devices. Additionally, in some embodiments a first portion of the program, code, or instructions execute on a first server device or a first computing device, while a second portion of the program, code, or instructions execute on a second server device or a second computing device. In some embodiments, other portions of the program, code, or instructions execute on other server devices as well. For example, in some embodiments, information may be stored on a memory element associated with the server device, such that the information is remotely accessible to users of the computer program via one or more computing devices. Alternatively, in other embodiments the information may be directly stored on the memory element associated with the one or more computing devices of the user. In additional embodiments of the present disclosure, a portion of the information is stored on the server device, while another portion is stored on the one or more computing devices. It will be appreciated that in some embodiments the various actions and calculations described herein as being performed by or using the computer program are performed by one or more computers, processors, or other computational devices, such as the computing devices and/or server devices, independently or cooperatively executing portions of the computer program.

Various embodiments of the presently disclosed technology are accessible to one or more users via one or more electronic resources, such as an application, a mobile "app," or a website. In certain embodiments, portions of the computer program are embodied in a stand-alone program downloadable to a user's computing device or in a web-accessible program that is accessible by the user's computing device via a communication network. For some embodiments of the stand-alone program, a downloadable version of the computer program is stored, at least in part, on a server device. A user downloads at least a portion of the computer program onto the computing device via the communication network. After the computer program has been downloaded, the program is installed on the computing device in an executable format. Some embodiments of the web-accessible computer program are configured to allow a user to simply access the computer program via the network (e.g., the Internet) with the computing device.

After reviewing the present disclosure, an individual of ordinary skill in the art will immediately appreciate that some details and features can be added, removed and/or changed without deviating from the spirit of the disclosure. Reference throughout this specification to "one embodiment," "an embodiment," "additional embodiment(s)" or "some embodiments," means that a particular feature, structure or characteristic described in connection with the embodiment(s) is included in at least one or some embodiment(s), but not necessarily all embodiments, such that the references do not necessarily refer to the same embodiment(s). Furthermore, the particular features, steps, structures, or characteristics may be combined in any suitable manner in one or more embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

What is claimed is:

1. A computer implemented method for managing access to a virtual reality (VR) platform by a user using a non-virtual reality (non-VR) mobile application, comprising:

causing presentation, through a client mobile device via the non-VR mobile application, of graphical representations of a plurality of support channels;

responsive to the presentation of the graphical representations of the plurality of support channels, receiving, through the client mobile device via the non-VR mobile application, a selection of a target support channel from the plurality of support channels, the target support channel corresponding to a target virtual room established by the VR platform;

causing presentation, through the client mobile device via the non-VR mobile application, of a wait-time indicator that indicates an estimated waiting time before the user using the non-virtual reality (non-VR) mobile application can communicate with a support representative associated with the target virtual room;

causing presentation, through the client mobile device via the non-VR mobile application, of a communication interface that facilitates communication between the user and the support representative via a secure communication channel;

causing presentation, through a computing device via the VR platform, of the target virtual room, the target virtual room including a display of a plurality of user identifiers corresponding to a plurality of users waiting to interact with one or more support representatives, the plurality of user identifiers being sorted on a wait list based, at least in part, on an elapsed wait time associated with each of the plurality of users;

causing presentation, through the computing device via the VR platform, a graphical assistance pod;

receiving, through the computing device, input provided by the support representative to activate the graphical assistance pod;

responsive to activation of the graphical assistance pod, causing activation of a user interface that automatically presents selectable tools usable by the support representative for managing interactions with one or more users that have selected the target support channel;

receiving, through the computer device, a selection made by the support representative after activating the graphical assistance pod to communicate with the user via the secure communication channel; and establishing the secure communication channel between the support representative using the VR platform and the user using the non-VR mobile application.

2. The computer implemented method of claim 1, wherein the user using the non-VR mobile application is a first user and wherein the plurality of users waiting to interact with one or more support representatives include the first user and a second user using the VR platform.

3. The computer implemented method of claim 1, wherein activation of the graphical assistance pod comprises detecting the support representative navigating a first avatar into a boundary of the graphical assistance pod.

4. The computer implemented method of claim 3, wherein the graphical assistance pod is configured such that at least a second support representative having qualified credentials can direct at least a second avatar to enter the graphical assistance pod in which the first avatar has entered, to assist the support representative.

5. The computer implemented method of claim 4, further comprising responsive to detecting that the at least a second avatar enters the graphical assistance pod, causing display of profile information of the user via a user interface to the at least a second support representative.

6. The computer implemented method of claim 1, further comprising updating the wait list to remove a user identifier corresponding to the user from the display.

7. The computer implemented method of claim 1, further comprising activating a visible indicator of the graphical assistance pod in the virtual room to indicate that the support representative is engaged in communication with the user.

8. The computer implemented method of claim 7, wherein the visible indicator aligns with a boundary of the graphical assistance pod.

9. The computer implemented method of claim 1, wherein said reception of the selection of the support channel via the non-VR mobile application initiates a request for the selected support channel's resources configuration and current wait time data.

10. The computer implemented method of claim 1, wherein the secure communication channel is a secure voice communication channel.

11. The computer implemented method of claim 1, further comprising causing presentation of user profile information including at least one of call history, contact history, or notes associated with the user via the user interface.

12. A computer implemented method, comprising:
causing presentation of a virtual room including display of a plurality of user identifiers corresponding to a plurality of users including one or more users using a non-virtual reality (non-VR) mobile application and one or more users using a virtual reality (VR) platform, the plurality of users waiting to interact with one or more support representatives, and the plurality of user identifiers being sorted on a wait list based, at least in part, on an elapsed wait time associated with each of the plurality of users;

causing display of a graphical assistance pod;

receiving input provided by a support representative to activate the graphical assistance pod, and where, upon activation of the graphical assistance pod, credentials of the support representative are automatically verified for the VR platform;

causing display of a user interface to automatically present tools selectable by the support representative for managing interactions with the plurality of users;

subsequent to the display of the user interface, receiving a selection made by the support representative to communicate with at least one of the plurality of users using the non-VR mobile application; and establishing a secure communication channel between the support representative and the at least one of the plurality of users using the non-VR mobile application.

13. The computer implemented method of claim 12, further comprising causing presentation, responsive to establishment of the secure communication channel, of profile information of the at least one of the plurality of users to the support representative.

14. The computer implemented method of claim 12, wherein activation of the graphical assistance pod comprises detecting the support representative navigating a first avatar into a boundary of the graphical assistance pod.

15. The computer implemented method of claim 14 wherein the support representative is a first support representative, further comprising detecting a second support representative navigating a second avatar into the boundary of the graphical assistance pod, to assist the first support representative.

16. The computer implemented method of claim 15 wherein when the second avatar enters the boundary of the graphical assistance pod, a user interface displays profile information of the at least one of the plurality of users to the second support representative.

17. The computer implemented method of claim 12, further comprising activating a visible indicator of the graphical assistance pod to indicate that the support representative is engaged in communication with the at least one of the plurality of users.

18. The computer implemented method of claim 17 wherein the visible indicator aligns with a boundary of the graphical assistance pod.

19. The computer implemented method of claim 12, wherein the secure communication channel is a secure voice communication channel.

20. The computer implemented method of claim 12, further comprising causing presentation, responsive to establishment of the secure communication channel, of at least one of contact history, call history, or notes associated with the at least one of the plurality of users.

\* \* \* \* \*